Aug. 6, 1968
J. V. FREDD
3,395,618
OPERATOR DEVICES
Original Filed May 28, 1965
6 Sheets-Sheet 3
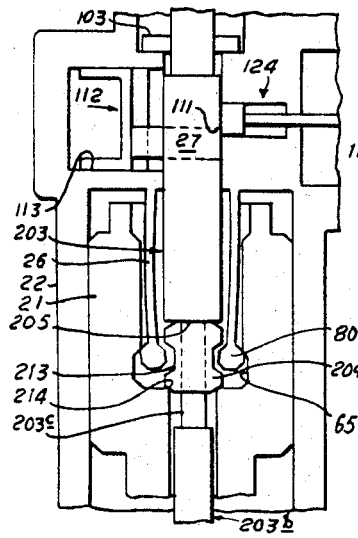
Fig. 9
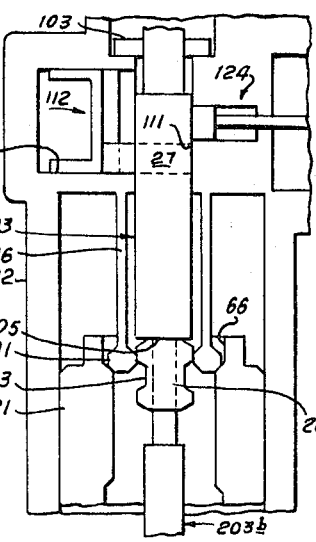
Fig. 10
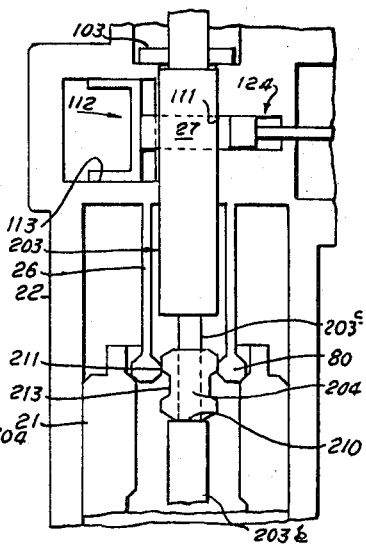
Fig. 11
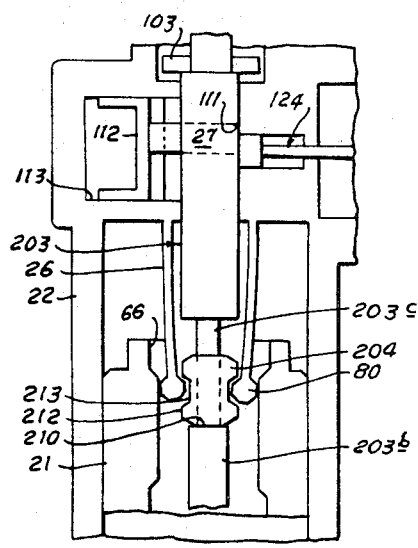
Fig. 12
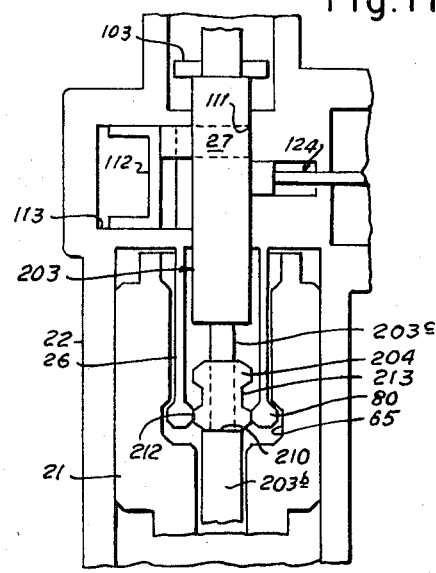
Fig. 13
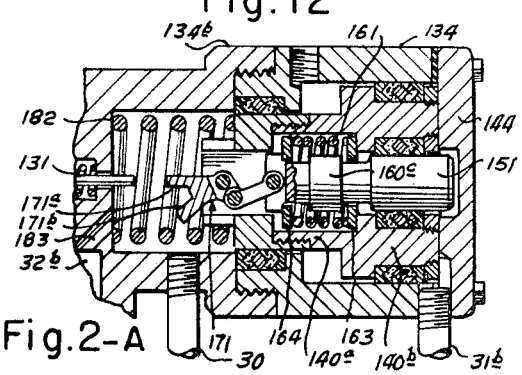
Fig. 2-A
INVENTOR
John V. Fredd
BY *[signatures]*
ATTORNEYS

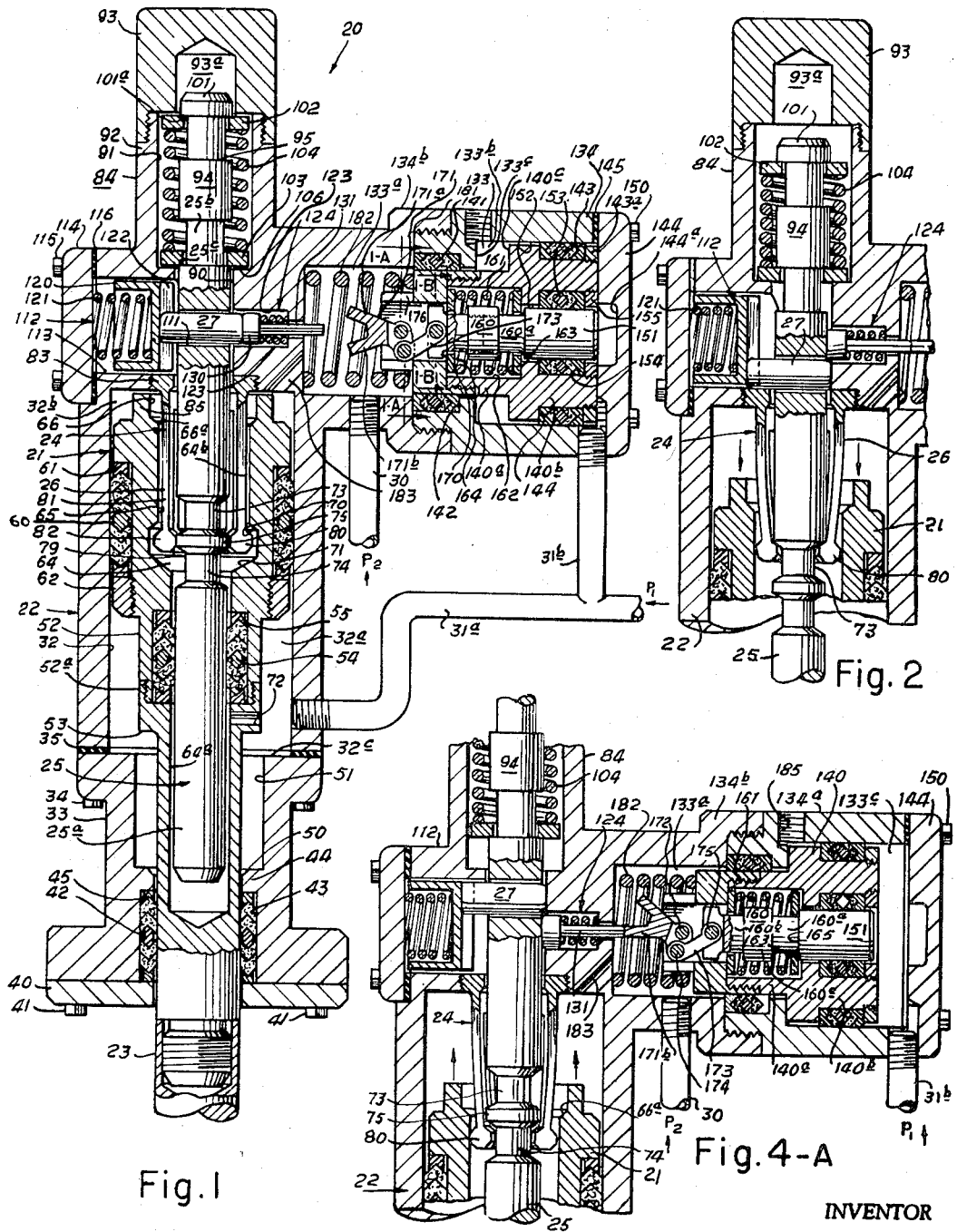

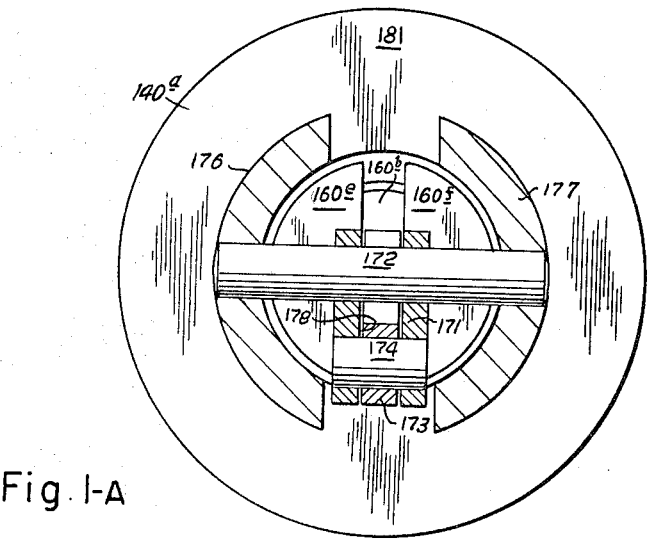
Fig. I-A
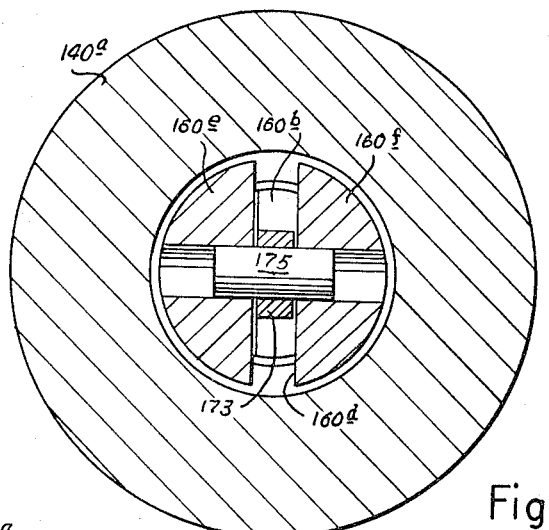
Fig. I-B
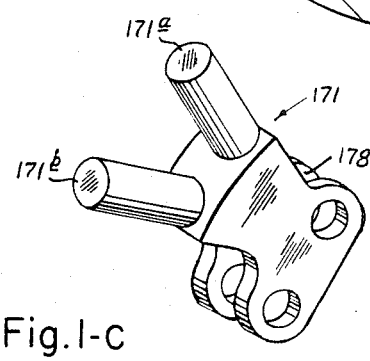
Fig. I-C
INVENTOR
John V. Fredd

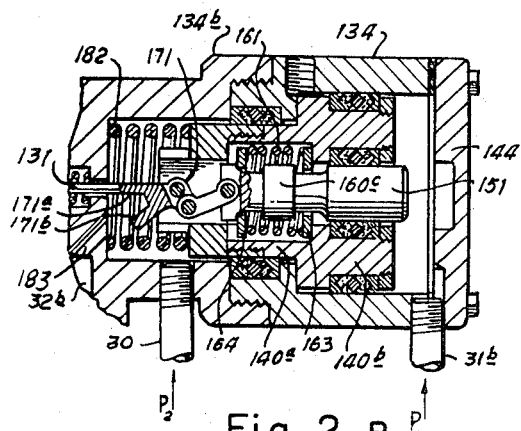
Fig. 2-B
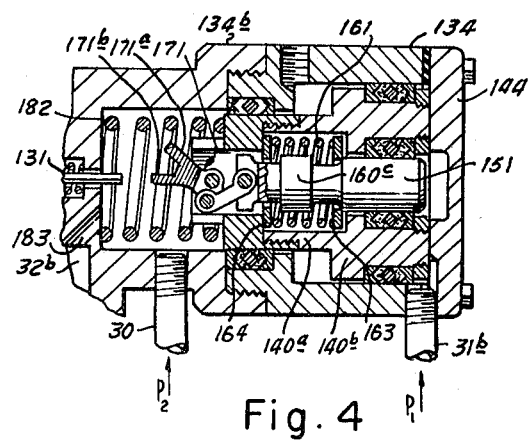
Fig. 4
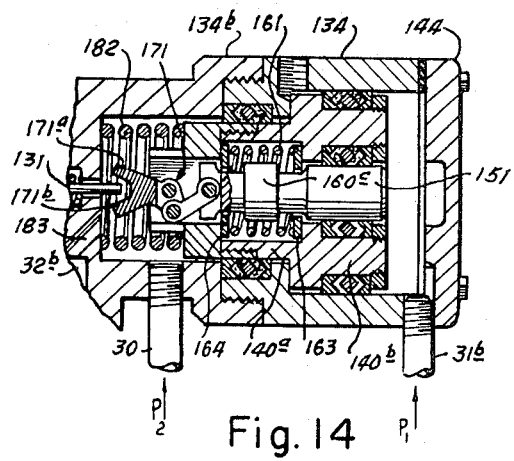
Fig. 14
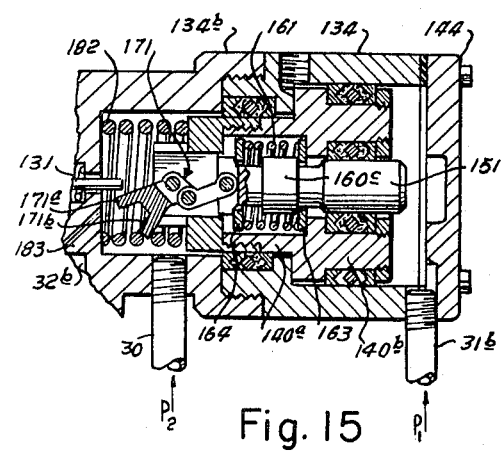
Fig. 15
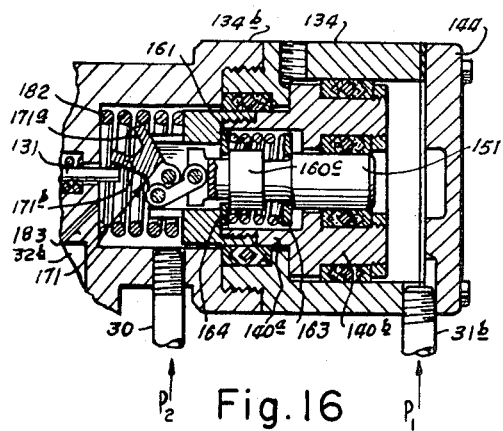
Fig. 16
INVENTOR
John V. Fredd
BY
ATTORNEYS

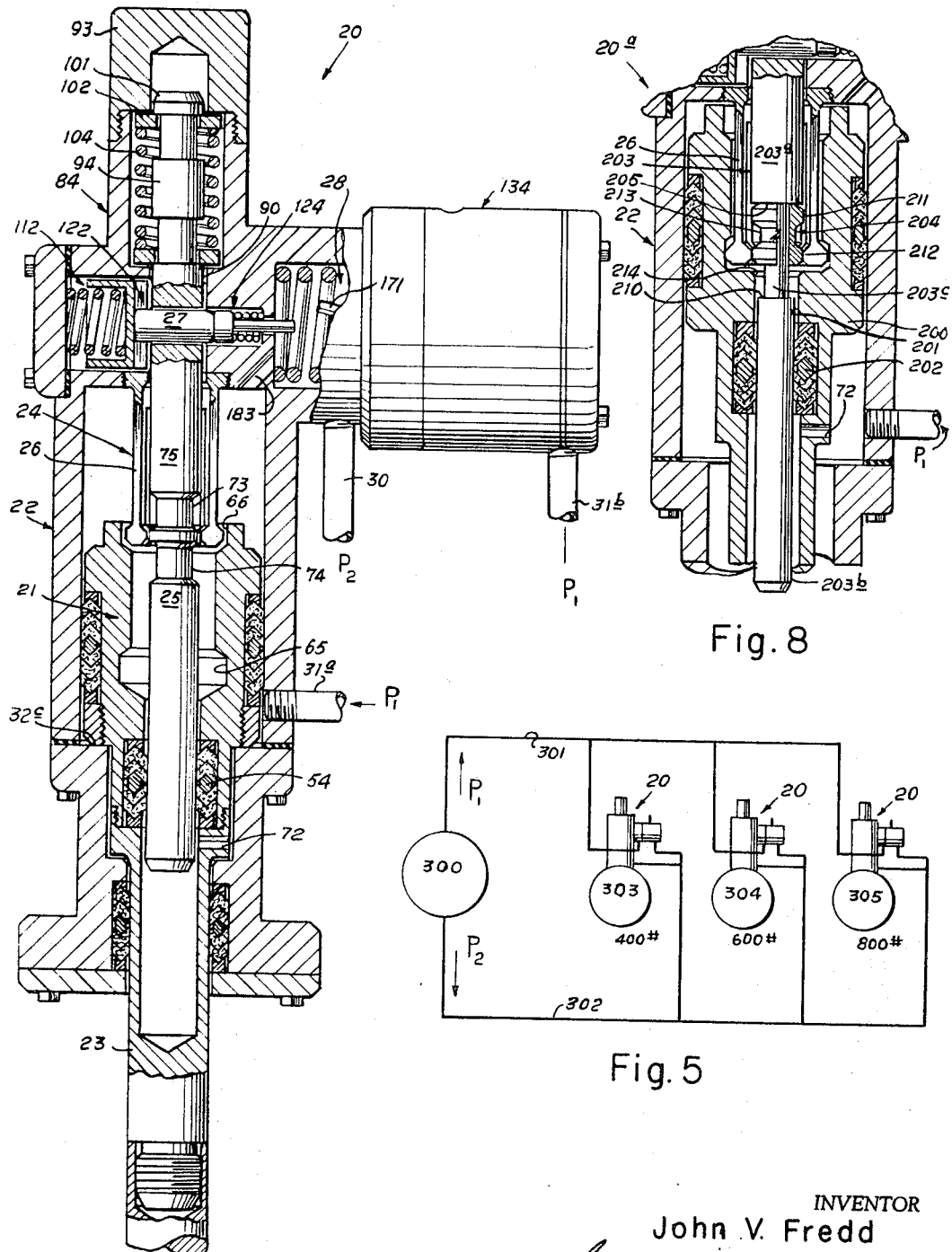

Aug. 6, 1968  J. V. FREDD  3,395,618
OPERATOR DEVICES
Original Filed May 28, 1965  6 Sheets-Sheet 6

INVENTOR
John V. Fredd
BY
ATTORNEYS

United States Patent Office

3,395,618
Patented Aug. 6, 1968

3,395,618
OPERATOR DEVICES
John V. Fredd, Dallas, Tex., assignor to Otis Engineering Corporation, Dallas, Tex., a corporation of Delaware
Original application May 28, 1965, Ser. No. 459,843, now Patent No. 3,315,568, dated Apr. 25, 1967. Divided and this application Aug. 24, 1966, Ser. No. 591,066
5 Claims. (Cl. 92—24)

ABSTRACT OF THE DISCLOSURE

A fluid pressure controlled system for accomplishing actuation of selected ones of a plurality of operator mechanisms or devices in response to predetermined pressure differential signal conditions or combinations, said operator devices being normally locked against movement and releasable upon application of such predetermined pressure differential signal condition or combination to said operator device to release the same for movement, and continued application of pressure to said operator device effects movement thereof to accomplish the work function. A plurality of devices are connected in flow communication for selective operation of a predetermined one of said devices.

---

This application is a division of application Ser. No. 459,843, filed May 28, 1965, now Patent No. 3,315,568.

This invention relates to a fluid pressure controlled system of operator devices and more particularly to fluid actuated operator devices.

It is an object of the invention to provide a fluid pressure controlled system including a plurality of new and useful operator devices which performs a useful work function in response to a predetermined combination of fluid pressure signals.

It is another object of the invention to provide a fluid pressure controlled system including a plurality of fluid actuated operator devices each of which is non-responsive to either a single fluid pressure signal or a combination of fluid pressure signals other than a specific predetermined combination of such pressure signals.

It is a further object of the invention to provide a system of the character described wherein each fluid actuated operator device which will remain in a locked inoperable condition when pressure signals other than a predetermined combination of pressure signals is transmitted to the device.

It is a still further object of the invention to provide a fluid pressure controlled system of the character described including a plurality of operator devices, each operator device having a piston which is releasable from a locked condition in response to a predetermined combination of pressure signals and thereafter movable longitudinally responsive to fluid pressure.

It is an additional object of the invention to provide a flow pressure controlled system of the character described including a plurality of fluid actuated operator devices, each fluid actuated operator device having a piston which reciprocates to perform a useful work function in response to a predetermined combination of fluid pressure signals transmitted to the device through conduits extending from a remote location.

It is another object of the invention to provide a fluid pressure controlled system of the character described including a plurality of fluid actuated operator devices, each fluid actuated device including a piston which is power driven in two longitudinal directions from spaced apart positions at which the piston is lockable and is unlockable in response to a predetermined combination of fluid conducted pressure signals.

It is a further object of the invention to provide a fluid pressure controlled system including a plurality of fluid actuated operator devices, of which each fluid actuated operator device is operable in response to two fluid pressure levels which are established and maintained at a predetermined differential while the pressures are uniformly and simultaneously raised.

It is another object of the invention to provide a system of the character described wherein each fluid actuated operator device remains in a locked condition when fluid is conducted to the device through two conduits between which a pressure differential is maintained above or below the required predetermined differential range.

It is a further object of the invention to provide a fluid pressure controlled system including a plurality of fluid actuated operator devices in which each fluid actuated operator device is used to accomplish work functions with each device being operable in response to different combinations of fluid pressure signals conducted to such system.

It is another object of this invention to provide a system including a plurality of pressure actuated operator devices each of which is operable in response to a predetermined combination of pressure signals.

Additional objects and advantages of the invention will be readily apparent from the reading of the following description of a device constructed in accordance with the invention, and reference to the accompanying drawings thereof, wherein:

FIGURE 1 is a longitudinal view partly in section and partly in elevation illustrating a fluid pressure actuated operator device in accordance with the invention, showing the main piston and piston rod locked at an upper end position;

FIGURE 1-A is a view in section of the tumbler push rod linkage taken along the line 1-A—1-A of FIGURE 1;

FIGURE 1-B is a view in section of the connection between the trigger piston and the link extending to the tumbler push rod as seen along the line 1-B—1-B of FIGURE 1;

FIGURE 1-C is a view in perspective of the tumbler push rod;

FIGURE 2 is a fragmentary view partly in section and partly in elevation showing the main piston released and moving downwardly;

FIGURE 2-A is a fragmentary view partly in elevation and partly in section showing the trigger piston displaced to the right relative to the plunger piston and the plunger piston at its far right position ready for movement toward the left to release the tumbler when unlocking the main driving piston at its upper end position;

FIGURE 2-B is a fragmentary view similar to FIGURE 2-A showing the positions of the trigger and plunger pistons when the tumbler has been released as in FIGURE 2;

FIGURE 3 is a longitudinal view partly in section and partly in elevation of the operator device showing the main piston locked at the lower end position;

FIGURE 4 is a fragmentary view similar to FIGURE 2-A showing the plunger piston at its far right position and the trigger piston displaced to the left preparatory to releasing the tumbler when unlocking the main driving piston from its lower end position;

Figure 6:
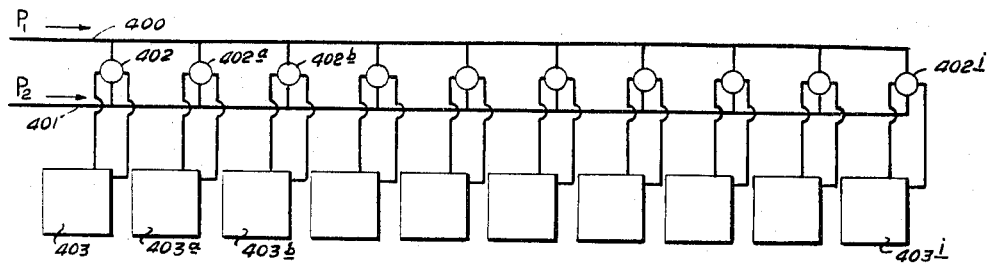
Figure 7:
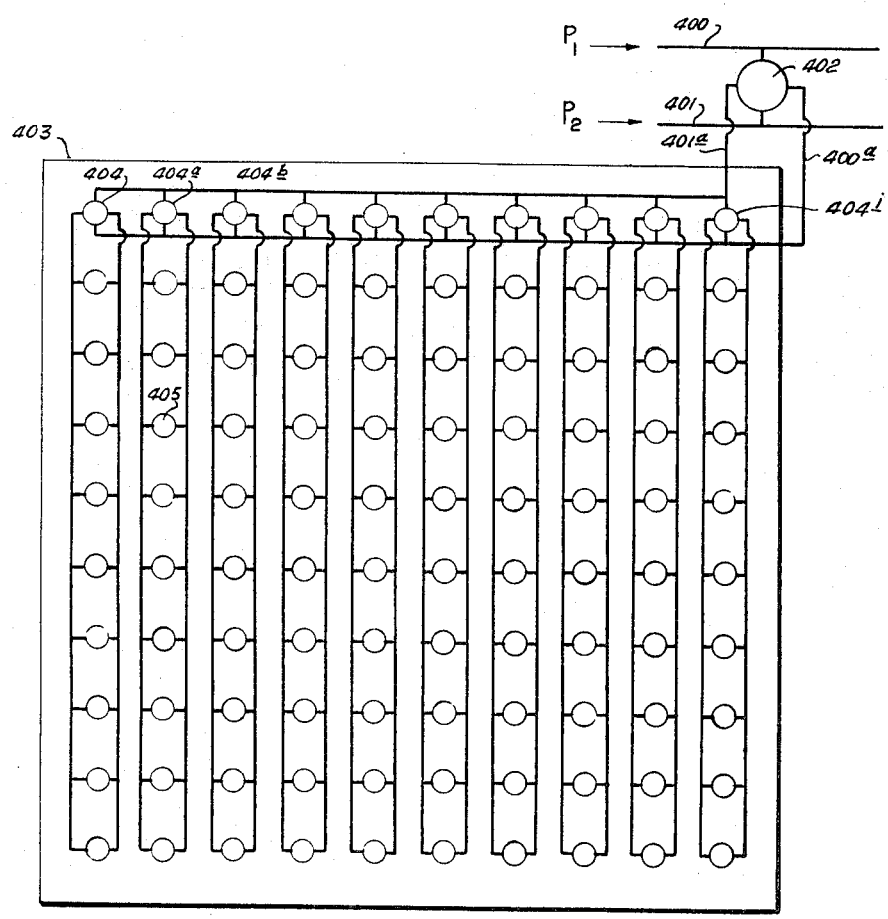

FIGURE 4-A is a fragmentary view partly in section and partly in elevation illustrating the position of the locking stem assembly when the main driving piston is unlocked from its lower end position and is moving upwardly and the positions of the plunger and trigger pistons when releasing the tumbler for such main piston movement;

FIGURE 5 is a diagrammatic plan view of one system employing a plurality of the operator devices;

FIGURE 6 is a diagrammatic plan view of another system employing a plurality of the operator devices;

FIGURE 7 is an enlarged diagrammatic plan view of one unit of the system of FIGURE 6;

FIGURE 8 is a fragmentary view partly in section and partly in elevation illustrating an alternative form of operator device, showing the main piston locked at the upper end position;

FIGURE 9 is a fragmentary view in diagrammatic form of the operator device of FIGURE 8 showing the locking stem and spool at a downward position in which the main piston is released to cam the collet fingers inwardly to move downwardly;

FIGURE 10 is a view similar to FIGURE 9 showing the locking stem and spool at a lower end position holding the collet fingers locked outwardly to lock the main piston in a lower end position;

FIGURE 11 is a view similar to FIGURE 9 showing the main piston locked in the lower end position and the locking stem returned upwardly to its intermediate locked position;

FIGURE 12 is a view similar to FIGURE 9 illustrating the locking stem and spool moved upwardly from the intermediate locked position to release the main piston from the lower end position for movement upwardly;

FIGURE 13 is a view similar to FIGURE 9 showing the main piston locked at the upper end position with the locking stem and spool at the upper end position;

FIGURE 14 is a fragmentary view partly in section and partly in elevation showing the misaligned position of the trigger assembly when the plunger piston is at its far left position with a pressure differential being applied across the piston of a value below the required predetermined value for proper operation of the operator device;

FIGURE 15 is a view similar to FIGURE 14 showing the misaligned position of the trigger assembly when the plunger piston is moved to its far left position with the pressure at the left end of the plunger piston exceeding the pressure at the right end of the plunger piston by more than the required predetermined pressure differential for operation of the device; and, FIGURE 16 is a view similar to FIGURE 15 when the pressure at the right end of the plunger piston exceeds the pressure at the left end of the piston by more than the required predetermined value.

Referring to FIGURE 1, the operator device 20 includes a main piston 21 which is reciprocable and lockable at spaced apart positions within the main cylinder 22 to drive the piston rod 23 which is connected to the apparatus, not shown, to be actuated by the operator device. The main piston is held at the spaced apart positions by a locking assembly 24 including a locking stem 25 which fits within and coacts with a collet 26. The locking stem is releasably held at an intermediate position by a tumbler 27 which is movable to unlock the locking stem by a pressure actuated trigger assembly 28. The trigger assembly, locking assembly, and main piston are operated by fluid pressure from two sources conducted to the device through the conduits 30 and 31. The two pressures are first established with a predetermined differential between them to properly align the trigger assembly. The pressures are then raised simultaneously while maintaining the differential to move the tumbler to a position for unlocking the locking stems. The locking stem is displaced longitudinally by fluid pressure to positions for locking and unlocking the main piston.

The main cylinder 22 provides a cylindrical chamber 32 closed at the lower end by the head 33 secured on the lower end of the cylinder by a plurality of bolts 34. A gasket 35 seals between the lower end of the cylinder and the head. The retainer plate 40 secured to the head by the bolts 41 retains the packing assembly 42 within the recess 43 to seal around and prevent leakage along the piston rod. The packing assembly is held against upward movement by the internal flange 44 which forms the shoulder 45.

The flange 44 within the head 33 also forms an annular shoulder 50 at the lower end of the enlarged bore 51 of the head which receives the reduced portion 52 of the main piston when the piston is at its lower end position at which the shoulder 53 on the piston rod engages the shoulder 50 to hold the piston and rod against further downward movement. The lower end of the portion 52 of the main piston is formed integral with the piston rod 23 and threaded to the piston at 52a to hold the packing assembly 54 within the recess 55 around the lower section 25a of the locking stem.

The packing assembly 60 is held within the external annular recess 61 around the main piston by the retainer ring 62 threaded on the piston to seal around the piston with the wall of the chamber 32.

The longitudinally reciprocable locking stem 25 is positioned within the bore 64 of the main piston to cooperate with the collet assembly 26 for locking the main piston at its upper and lower end positions. The bore 64 has a lower reduced portion 64a which extends through the reduced portion of the main piston into the upper portion of the piston rod 23. The upper enlarged section 64b of the bore receives the collet and is provided with an internal annular locking recess 65 bounded by the upper annular shoulder 70 and the lower annular shoulder 71.

The lower section 25a of the locking stem extends through the seal assembly 54 into the portion 64a of the bore 64. Fluid pressure through the lateral port 72 in the main piston is applied to the lower section of the locking stem below the seal assembly biasing the stem upwardly responsive to fluid pressure within the lower chamber section 32a in the main cylinder below the main piston. The external surface of the portion 25a of the stem is spaced apart from the wall of the bore section 64a to permit fluid to freely flow from the port 72 around the stem within the bore.

An upper annular locking recess 73 and a lower annular locking recess 74 are formed in the locking stem substantially separated by the locking flange 75. The locking recesses receive the inner bosses 79 on the heads 80 of the collet fingers 81 to permit the collet fingers to be cammed inwardly around the locking stem at upper and lower positions of the stem. The locking flange 75 engages the inner bosses of the collet finger heads to prevent inward movement of the collet fingers at an intermediate position of the locking stem. In FIGURE 1 the collet fingers are held against inward movement by the flange 75 so that the outer bosses 82 of the collet finger heads are within the recess 65 to lock the main piston in the upper end position.

The collet fingers 81 are formed on a base ring 83 threaded into the body 84 in concentric relationship around the intermediate section 25b of the locking stem within the portion 64b of the main piston.

An internal annular locking recess 66 is formed within the upper end of the main piston above the sloping annular shoulder 66a to receive the heads of the collet fingers for locking the main piston at its lower end position as shown in FIGURE 3.

The upper end of the main piston is reduced in external diameter along a section 85 so that when the piston is at the upper end position, fluid may freely flow into the section 32b of the chamber 32 to displace the piston downwardly.

The intermediate section 25b of the locking stem is slidable through the bore 90 of the body 84. The bore 90 opens into the spring chamber 91 formed within the housing 92 formed on the body 84. A cap 93 is threaded on the outward end of the housing to close the spring chamber. The upper end section 25c of the locking stem extending into the spring chamber is reduced forming an upwardly facing shoulder 25d. An enlarged section 94 of the upper section 25c of the locking stem provides an upwardly facing shoulder 95 and a downwardly facing shoulder 100 around the stems. The head 101 is secured on the upper end of the stem to engage and limit the upward movement of the retainer washer 102 which with the washer 103 confines the spring 104 around the portion 25c of the stem. The spring 104 biases the locking stem toward a central position when the stem is displaced upwardly or downwardly. When the stem is at the upper end position, as in FIGURE 4–A, the head 101 is received in the chamber 93a of the cap 93. The engagement of the top shoulder 95 with the retainer washer 102, when the washer is in an uppermost position and in engagement with the cap 93, limits upward movement of the locking stem. Similarly, the engagement of the lower shoulder 100 with the retainer washer 103 when the washer is in a lower position in engagement with the internal shoulder 106 of the body 84, limits downward movement of the locking stem.

The locking stem is releasably held at the central position shown in FIGURE 1 by a tumbler 27 which is laterally movable in a transverse bore 111 extending through the portion 25b of the locking stem. The tumbler is biased to the right toward a locked position by a spring loaded locking plunger assembly 112 which is confined within the laterally extending cylindrical chamber 113 by a blind flange 114 held on the body 84 by the bolts 115. The gasket 116 seals between the blind flange and the body. The plunger assembly 112 includes the hollow cylindrical cap 120 and the spring 121 confined between the cap and the blind flange. The head of the cap 120 is provided with a slot 121 which as shown in FIGURE 1 is oriented longitudinally to receive the left end of the tumbler 110 to allow the tumbler when in unlocked position as in FIGURES 2 and 4 to move longitudinally the length of the diameter of the cylindrical chamber 113. The force of the spring 121 biases the tumbler toward the right so that when the locking stem 25 is in the central position shown in FIGURE 1, the right end of the tumbler is received in the bore 123 of the body member 84. The axes of the cylindrical chamber 113 and the bore 123 are coincident along a line intersecting and normal to the longitudinal axis of the bore 90. When the locking stem is at the central position of FIGURE 1 the axis of the bore 111 is coincident with the axis of the lateral bore 123 so that the plunger assembly 112 may push the right end of the tumbler into the bore 123 to hold the locking stem against longitudinal movement. A releasing plunger assembly 124 positioned within the bore 123 is biased against the right end of the tumbler. The releasing plunger assembly includes a head 130 on a stem 131 with a spring 132 around the stem biasing the head against the right end of the tumbler. The spring 121 of the locking plunger assembly is strong enough to push the tumbler into the bore 123 against the force of the spring 132 which functions only to keep the stem 131 in a leftward position with the head against the right end of the tumbler. The releasing plunger assembly is movable to the left by the fluid actuated trigger assembly 28 to displace the tumbler from the bore 123 to free the locking stem 25 for longitudinal movement for locking and unlocking the main piston.

The trigger assembly 28 is positioned within the stepped cylindrical chamber 133 in the housing 134 comprising the outer section 134a threaded into the inner section 134b formed on the body 84. The chamber 133 comprises an inner reduced section 133a and an outer enlarged section 133b. A stepped annular plunger piston 140 is slidably disposed within the chamber 133. The plunger piston has a reduced inner or left portion 140a fitting in sliding relationship within the reduced chamber portion 133a and a larger outer or right portion 140b which fits in sliding relationship within the enlarged chamber portion 133b. Leftward movement of the piston 140 is limited by engagement of the left end 140c of the enlarged section of the piston with the shoulder 133c at the left end of the chamber 133b. Rightward movement of the piston is limited by engagement of the right end of the piston with the right end of the chamber 133b, as in FIGURE 1. The packing assembly 141 within the annular recess 142 of the cylinder housing 134 seals around the inner portion 140a of the plunger piston. The packing assembly 143 is held by the retainer ring within the external annular recess 144 of the enlarged portion 140b to seal around the plunger piston within the enlarged portion 133b of the chamber 133. A blind flange 144 having a recess 144a in the inner face is secured over a gasket 145 by a plurality of bolts 150 to the head of the cylinder housing 134.

A small trigger piston 151 is slidably positioned in the bore 152 extending through the annular plunger piston. A packing assembly 153 is held within the internal annular recess 154 of the plunger piston by the retainer ring 155 to seal between the plunger piston and the trigger piston. The trigger piston is connected to a piston rod 160 about which is disposed a spring 161 within the spring chamber 162 of the plunger piston. The spring 161 which biases the trigger piston toward a neutral position is confined between the washers 163 and 164 which engage the opposing shoulders 165 and 170 at the opposite ends of the piston rod. The washers 163 and 164 are also engageable with the opposite ends of the spring chamber 162. The piston rod includes the reduced sections 160a and 160b which are connected into the internally threaded coupling 160c which forms an annular flange limiting the rod and piston 151 to moving the distance between the washers 163 and 164.

A forked push rod 171 having prongs 171a and 171b is pivotally supported on a pin 172 within the vertically slotted hollow inward end of the stepped piston 140 as best shown in FIGURE 1–A. The pin 172 extends between the cylindrical segments 176 and 177 formed on the inward end of the reduced section 140a of the plunger piston. A link 173 is pivotally connected at one end to the push rod by a pin 174 and at the other end to the trigger piston by a pin 175 so that when the trigger piston moves in either direction relative to the plunger piston the push rod is pivoted to align one of the prongs with the stem 131 responsive to a pressure differential applied across opposite ends of the trigger piston. The push rod is bifurcated on the outward end providing a slot 178 in which the inward end of the link 173 is received and held by the pin 174. The outward end of the link 173 is received in a slot 160d formed across the inward end of the piston rod 160 dividing the inward end of the rod into the two cylindrical segments 160e and 160f through which the pin 175 extends to pivot the link to the piston rod. When the trigger piston is moved to the left from the position of FIGURE 1 by the proper pressure differential across the piston the link 173 rotates the push rod clockwise around the pin 172 until the prong 171b is aligned with the stem 131 as in FIGURE 4. When the trigger piston is moved to the right by the proper pressure differential across the piston 151 the link 173 pivots the push rod counterclockwise to align the prong 171a with the stem 131 as in FIGURE 2–A.

The inward end of the plunger piston around the cylindrical segments 176 and 177 provides an external annular shoulder 181 for engagement of the outward end of the spring 182 confined between the shoulder 181 and the inward end of the chamber portion 133a to bias the plunger piston outwardly away from the plunger assembly 124 so that in the absence of a pressure relationship which forces the plunger piston inwardly the piston will be returned by the spring to a position as illustrated in FIGURE 1, at which the pushrod prongs are misaligned from the stem.

The section of the pitson rod supporting the link 173 is fitted loosely through the bore of the plunger piston leading through the inward end of the piston from the chamber 162 so that the pressure from within the chamber 133a is applied around the piston rod into the spring chamber 162 against the inward end of the trigger piston 151.

A flow channel 183 extends through the body 84 between the chamber 133a and the chamber 32b so that the pressure P2 applied into the chamber 133a through the conduit 30 is transmitted into the main cylinder and exerts a downward force on the main piston. This pressure P2 also exerts a downward force on the locking stem being applied across the upwardly facing surfaces of the locking stem within the line of sealing engagement of the seal assembly 54 with the locking stem. The lower end of the main piston below the seal means 60 and the outer end of the plunger piston are subjected to equal pressure P1 from the conduit 31 which is connected by the conduit 31a to the chamber 32a of the main cylinder and the conduit 31b to the outward or head end of the plunger cylinder housing 134. The downwardly facing surfaces of the locking stem 25 below the seal assembly 54 are also exposed to the pressure P1 from the conduit 31 through the port 72 of the main piston.

The effective area of the reduced inner section 140a of the plunger piston 140 sealed by the packing assembly 141 and exposed to the pressure P2 in the chamber 133a is substantially less than the effective area of the outer enlarged section 140b of the piston exposed to the pressure P1 at the outer end of the piston within the chamber 133c of the plunger cylinder chamber. The section 133b of the plunger cylinder is subjected to atmospheric pressure through the flow or vent passage 185. The effective areas at the opposite ends of the plunger piston are so related that the pressure P1 within the chamber 133c from the conduit 31b may displace the piston inwardly to the left even when such pressure is less than the pressure P2 within the chamber 133a at the inward end of the piston. The effective areas of the trigger piston 151 on opposite sides of the seal assembly 153 are equal so that a pressure differential between the opposite ends of the control piston will displace the trigger piston toward the lower pressure relative to the plunger piston for the purpose of aligning one of the prongs of the push rod 171 with the stem 131 to displace the tumbler 110 out of the bore 123 to release the locking stem 25. The linking arrangement between the push rod and the trigger and plunger pistons is such that the prongs of the push rod are not rotated far enough to align with the stem 131 by a pressure differential across the plunger piston of too low a value and is rotated beyond the point of alignment by a pressure differential in excess of the proper value.

In operation, the operator device 20 is connected through the piston rod 23 with the apparatus the operator device is to actuate and is connected to a source of fluid pressure 131 through the conduit P and a source of fluid pressure P2 through the conduit 30. The pressure P1 and P2 are independently controllable to the values required to actuate the operator device. The pressure P1 is applied through the conduit 31a to the lower end of the main piston 21 within the chamber 32a, to the lower end of the locking stem 25 within the bore 64a of the piston rod 23 through the port 72, and to the outward ends of the plunger and trigger pistons within the chamber 133c. The pressure P2 is applied to the upper ends of the main piston 21 and the locking stem 25 above the packing assembly 54 by the communication provided from the chamber 133a through the passage 183 into the chamber 32a above the main piston. The pressure P2 is also applied from the chamber 133a to the inward end of the plunger piston 140 over the effective area sealed off by the packing 141 and to the inward end of the piston 151 across the effective area sealed off by the packing 153. The inward end of the enlarged portion 140b of the control cylinder exposed to the chamber 133b is subjected to atmospheric pressure through the opening 185 in the control cylinder housing 134.

Assume for purposes of describing the operating steps of the operator device that the main piston 21 is initially locked at its upper end position as illustrated in FIGURE 1 and the locking assembly 24 together with the trigger assembly 28 are positioned as shown. The main piston 21 is locked at the upper end position by the outer bosses 82 on the collet fingers 81 which are held in an outward position within the lower locking recess 65 of the main piston by engagement of the locking flange 75 on the locking stem with the inner bosses 80 of the collet fingers. The locking stem 25 is secured at its central or neutral position against longitudinal movement by the tumbler 27 which is biased by the spring plunger assembly 112 into the bore 123 of the body 84. In this position the upper portion of the locking stem is so positioned within the spring chamber 91 that the shoulder 25 and the shoulder 101a around the lower end of the head 101 are aligned with the opposite ends of the spring chamber permitting the spring 104 to bias each of the washers 102 and 103 against an end of the chamber. The pressure P1 is at a sufficiently low value that the springs 182 and 161 are biasing the plunger piston and the trigger piston to the right away from the plunger assembly 124 so that the prongs of the push rod 171 are misaligned from the stem 131 and spaced to the right from the stem.

The first step in the procedure of unlocking the main piston for downward movement is the release of the locking stem for longitudinal movement so that the collet may be disengaged from the main piston. The pressure P2 is raised to a predetermined value in excess of the pressure P1 to insure that the force exerted by the pressure P2 on the plunger piston 140 in conjunction with the biasing force of the spring 182 displaces the plunger piston 140 to the right until the head of the piston engages the inner face of the blind flange 144 as shown in FIGURE 1. Normally, the spring 182 will hold the plunger piston to the right in the absence of a pressure differential across the piston which displaces the piston to the left. However, to insure that the plunger piston is not stuck in a position which would prevent proper operation of the trigger assembly, the pressure P2 is initially raised as described. The trigger piston 151 is also now displaced to the right relative to the plunger piston as shown in FIGURE 2–A with the head of the trigger piston being received in the recess 144a of the blind flange 144 by the pressure differential thereacross. The movement to the right of the trigger piston relative to the plunger piston rotates the push rod 171 counterclockwise around the pin 172 and compresses the spring 161. If the difference between the pressures P2 and P1 is established at the value for which the operator device is designed, the push rod prong 171a will be rotated into alignment with the stem 131. The pressure differential required to move the trigger piston the necessary distance relative to the plunger piston is determined by the strength of the spring 161. The required pressure differential may be varied by change of the spring or by the use of spacers similar to the washers 163 and 164 at either end of the spring to initially compress the spring so that a greater pressure differential is required to move the trigger piston relative to the plunger piston. On the other hand, if the pressure differential is less than the predetermined value the push rod will not be rotated sufficiently to align the prong with the stem, while if the pressure differential is in excess of the predetermined value the push rod will be over rotated so that the prong 171a passes the stem 131 to a location out of alignment with and below the stem as in FIGURE 15. The rightward movement of the trigger piston relative to the plunger piston effects compression of the spring 161 by the washer 164 which is engaged by the shoulder 170 on the piston rod 160. As long as the pressure differential maintains the trigger piston to the right relative to the plunger piston the spring will remain compressed biasing the trigger piston back leftward toward the neutral position shown in FIGURE 1.

After the predeterminated differenital between the pressures P2 and P1 is established to both displace the plunger piston to the right and to displace the trigger piston to the right relative to the plunger piston so that the push rod prong 171a is aligned wih the stem 131, both the pressures P1 and P2 are uniformly raised in value with the predetermined differential being maintained between the pressures. FIGURE 2–A shows the push rod prong aligned with the stem 131 and both pistons ready to move to the left to contact the stem. For example, assuming that the pressure P1 is initially zero p.s.i.g. and the pressure P2 is raised to 50 p.s.i. to displace the plunger piston to the right and align the push rod prong with the stem 131, both the pressure P1 and P2 are now raised uniformly so that P2 will remain 50 p.s.i. above P1. The effective area of the enlarged section 140b of the plunger piston exposed to the pressure P1 is greater than the effective area of the reduced section 140a exposed to the pressure P2 and therefore the force exerted against the piston by the pressure P1 will increase at a more rapid rate than the force exerted by the pressure P2 on the piston. Though initially the force from the pressure P2 is sufficient to displace the piston to the right, as both of the pressures are increased the force from the pressure P1 will exceed the force from the pressure P2 to cause the plunger piston to move to the left toward the stem 131. For example, assume that the effective sealed area of the enlarged portion 140b of the plunger piston is two square inches while the effective sealed area of the reduced portion 140a of the piston is one square inch. With the pressure P1 at zero p.s.i.g. and the pressure P2 50 p.s.i.g. the piston will be pushed to the right by the pressure P2 with a force of 50 pounds. When P1 is raised to 25 p.s.i.g. and P2 to 75 p.s.i.g., the force to the right on the piston from P2 is 75 pounds while the force to the left from P1 is 50 pounds. Raising P1 to 50 p.s.i.g. and the pressure P2 to 100 p.s.i.g. produces a force to the left from P1 of 100 pounds and a force to the right from P2 of 100 pounds. Now, when P1 is raised to 75 p.s.i.g. the force to the left becomes 150 pounds while P2 at a 50 pound differential of 125 p.s.i. produces a force toward the right of 125 pounds. Thus, with this example piston ends area relationship and by maintaining the 50 pound differential between P1 and P2 the pressures may be simultaneously and equally increased with the net force on the plunger piston causing the piston to move to the left after P1 passes 50 p.s.i.g. and P2 passes 100 p.s.i.g. Further increases in the two pressures produces further proportionate increases in the force on the piston with the force from P1 increasing to a substantially greater value than the force from P2. For example, when P1 reaches 1000 p.s.i.g. the force on the piston to the left will be 2000 pounds while the P2 being at 1050 p.s.i.g. will produce a force to the right of 1050 pounds.

As the plunger piston moves to the left against the spring 182 in the above described manner the trigger piston is maintained displaced to the right relative to the plunger piston by the pressure differential across the plunger piston so that the push rod prong 171a is held in alignment with the stem 131. The leftward movement of the plunger and trigger pistons causes the push rod prong to strike the end of the stem 131. When the push rod prong engages the stem as in FIGURE 2–B; the plunger assembly 124 is moved to the left pushing the tumbler 27 to the left causing the cap 120 to compress the spring 121 allowing the tumbler to move out of the bore 123. When the right end of the tumbler is displaced from the bore 123 the tumbler is free to slide up and down a distance determined by the diameter of the bore 113. The left end of the tumbler slides within the slot 122 in the cap. As the right end of the tumbler leaves the bore 123 the biasing effect of the pressure differential across the locking stem displaces the locking stem longitudinally. The edges of the right end of the bore 111 engages the chamfered left end of the plunger head 130 to prevent the head entering the bore 111. Release of the tumbler frees the locking stem 25 for longitudinal movement within the limits of movement permitted by the engagement of the shoulders 95 and 100 with the washers 102 and 103. The washers in turn engage the upper and lower ends of the spring chamber 91 depending upon the direction of movement of the stem.

The pressure P2 is applied from the chamber 133a through the flow passage 183 into the chamber 32b to the locking stem 25 above the packing assembly 54 so that the pressure P2 acts on the locking stem tending to move the stem downwardly against the spring 104. The pressure P1 is applied through the conduit 31 into the chamber 32a below the main piston and through the flow passage 72 in the main piston rod into the bore 64a against the locking stem below the packing 54. The effective area of the locking stem above the packing 54 against which the pressure P2 acts is equal to the effective area of the locking stem below the packing against which the pressure P1 acts. Since P2 is greater than P1 and the locking stem is free for longitudinal movement the pressure P2 moves the locking stem downwardly against the force of the spring 104 until the shoulder 100 engages the upper face of the washer 103 at the position illustrated in FIGURE 2. With the locking flange 75 on the locking stem now misaligned from or moved downwardly away from the inner bosses 80 the flange no longer holds the collet fingers locked in an outward position. The locking recess 73 of the stem is aligned with the inner bosses 80 of the collet fingers whereby the heads of the collet fingers may be biased into the locking recess. Since the pressure P2 within the chamber 32b acting on the upper end of the main piston biases the main piston downwardly, the shoulder 70 within the piston engages the external bosses 82 on the collet fingers holding the main piston in the upward position so long as the locking flange 75 on the locking stem is within the inner bosses of the collet fingers. With the locking stem displaced downwardly to free the collet fingers the internal annular shoulder 70 within the main piston acting against the external bosses on the collet fingers cams the collet fingers inwardly into the locking recess 73 so that the wall of the bore 64b of the main piston may pass downwardly over the external bosses of the collet fingers as illustrated in FIGURE 2, allowing the pressure P2 to displace the main piston in a downward direction. If the pressure differential maintained between P2 and P1 is not sufficiently high to move the main piston downwardly against the load connected to the piston rod 23 the pressure P2 may be increased to any necessary value immediately subsequent to the displacement of the tumbler 27 from the bore 123. As previously indicated, the pressure differential between P2 and P1 cannot exceed a predetermined value to maintain the alignment of the push rod 171 with the stem 131. Once however, the push rod has displaced the stem to the left sufficiently to disengage the tumbler from the bore 123 it is no longer necessary to keep the push rod and stem 131 aligned and therefore P2 may be raised to the value above P1 required to drive the main piston downwardly.

When the main piston arrives at its lower end position it is restrained against further downward movement by the lower end of the retainer ring 62 striking the lower end 32c of the chamber 32 as shown in FIGURE 3. At this position of the main piston the annular locking recess 66 in the upper end of the piston is aligned with the heads of the collet fingers so that the outer bosses 82 of the collet finger heads are received in the locking recess allowing the collet fingers to expand outwardly into the locking recess to lock the main piston in the downward position of FIGURE 3. The pressure P2 is reduced and when it reaches a sufficiently low value the compressed spring 104 expands acting through the washer 102 against the head 101 on the locking stem lifting the locking stem until the washer 102 engages the upper end of the spring chamber 91 returning the locking stem to the neutral position at which the tumbler 27 is realigned with the lateral bore 123. The pressure P1, if not already low enough, is reduced to a value sufficiently low that the force of the spring 182 exceeds the force of the pressure against the outward end of the plunger piston so that the spring displaces the plunger piston to the right sufficiently to disengage the push rod 171 from the stem 131 to allow the plunger assembly 124 to be moved by the tumbler 27 back into the bore 123 for locking the locking stem. The force of the spring 121 in plunger assembly 112 pushes the tumbler to the right back into the bore 123 to again lock the locking stem against longitudinal movement. As in FIGURE 3, the locking flange 75 on the locking stem is in alignment with the inner bosses 80 of the collet finger heads to hold the collet finger heads outwardly within the locking recess 66 of the main piston to maintain the main piston in the downward position holding the piston against upward movement.

The main piston is unlocked from the lower end position of FIGURE 3 by raising the pressure P1 to the required predetermined value above the pressure P2 to align the push rod 171 with the stem 131. This predetermined pressure differential acting across the plunger and trigger pistons displaces the trigger piston inwardly or to the left relative to the plunger piston as shown in FIGURE 4 causing clockwise movement of the push rod 171 to pivot the prong 171b into alignment with the stem. As the trigger piston moves to the left relative to the plunger piston the link 173 acts through the pin 174 to pivot the push rod with the link rotating about the pin 172. With the proper differential between the pressures P1 and P2 the push rod prong is aligned with the stem 131 as shown in FIGURE 4 so that when the plunger and trigger pistons are moved to the left the prong will engage the outward end of the stem. The springs 161 and 182 are of such strengths that when the P1 is initially raised the trigger piston is moved to the left relative to the plunger piston. In other words, the spring 182 biases the plunger piston to the right allowing the trigger piston to be moved to the left before the plunger piston starts its leftward movement. The pressures P1 and P2 are now each simultaneously and uniformly increased maintaining P1 at the desired predetermined value above P2 so that the plunger and the trigger pistons are moved to the left in the relative positions of FIGURE 4 with the push rod 171 engaging the stem 131 to displace the tumbler from the bore 123 against the force of the plunger assembly 112 to release the locking stem 25 as in FIGURE 4–A. The pressure P1 is also acting through the conduit 31a within the chamber 32a and through the flow passage 72 into the bore 64a of the piston rod below the locking stem. Since the pressure P1 is greater than the pressure P2 the locking stem is displaced upwardly as soon as the right end of the tumbler 27 leaves the bore 123. When the locking stem is released the pressure P2 may be lowered if desired or if necessary to create a higher differential to move the main piston against the load on the main piston rod. The pressure P1 displaces the locking stem to the upward position as shown in FIGURE 4–A at which the stem is held against further upward movement by the engagement of the shoulders 95 with the washer 102 which is held against the upper end of the spring chamber 91. The spring 104 is compressed by the washer 103 which is lifted by the locking stem toward the washer 102. The upward movement of the locking stem positions the lower locking recess 74 on the stem in alignment with the heads of the collet fingers so that the inner bosses 80 of the collet finger heads may be received within the locking recess when the collet heads are cammed inwardly by the main piston as shown in FIGURE 4–A. When the locking stem is moved to the upward position the higher pressure P1 acting against the lower end of the main piston within the chamber 32a pushes the piston upwardly with the internal annular shoulder 66a at the lower end of the upper locking recess 66 engaging the outer bosses 82 on the collet finger heads camming the collet fingers inwardly so that the wall of the bore 64b will pass over the collet fingers to allow the pressure P1 to displace the main piston back to the upper end position shown in FIGURE 1. When the upper end of the main piston engages the upper end of the chamber 32 the annular locking recess 65 within the piston is aligned with the collet finger heads allowing the collet fingers to spring outwardly into the locking recesses so that the collet fingers will lock the main piston in the upper end position. With the collet finger heads moved out of the lower locking recess 74 of the locking stem and when the pressure P1 is reduced sufficiently to allow the plunger piston to be moved back to the right by the spring 182 the spring 104 pushes the locking stem downwardly to the position of FIGURE 1 at which it is locked by the plunger assembly 112 displacing the tumbler 27 back into the bore 123 to again lock the locking stem against longitudinal movement. Also, the locking flange 75 holds the collet heads within the annular locking recess 65 to lock the main piston at the upper end position. The spring 161 returns the trigger piston to the neutral position to rotate the push rod to the position of FIGURE 1. The main piston is reciprocated as desired between the upper and lower end positions at which the piston is lockable in accordance with the previously described procedures. The unlocking of the piston at either end of its stroke may be effected only by using the particular pressure differential for which the operator device is designed. The main piston cannot be moved until it has been unlocked by displacing the tumbler to the left and the tumbler cannot be moved to an unlocked position unless the proper predetermined pressure differential is established between the two pressures at the opposite ends of the plunger piston and maintained as the pressures are simultaneously raised to align one of the prongs of the push rod 171 with the stem 131 and maintain such alignment as the push rod is brought into engagement with the stem and displaces the stem out of the bore 123.

FIGURES 14–16 illustrate operation of the operator device under three different pressure conditions at which the push rod is not properly aligned to release the locking stem. When the pressure differential across the plunger and trigger pistons is below the required predetermined value as the pressures P1 and P2 are raised the trigger piston will remain at substantially the neutral position and thus the prongs of the push rod will straddle the stem as the plunger piston moves to the left, as in FIGURE 14. The left end 140c of the section 140b of the plunger piston engages the inward end 133c of the chamber 133b preventing the push rod linkage from moving far enough to strike the stem. In the FIGURE 15 the plunger piston has been moved to the left with the pressure P2 exceeding the pressure P1 by more than the required differential resulting in the prong 171a being pivoted counterclockwise beyond the aligned position with the stem. The rightward movement of the trigger piston is limited by the engagement of the right end of the piston rod coupling 160c with the left face of the washer 163. FIGURE 16 shows the misaligned position of the push rod when the pressure P1 and P2 have been raised with P1 exceeding P2 by more than the required amount, which causes the rod to be rotated clockwise until the prong 171b is beyond the aligned position. The trigger piston is displaced to the left until the left end of the coupling 160c engages the right face of the washer 164. FIGURE 16 also represents the condition when the pressure P1 is independently raised without raising P2 resulting in far left movement of both the trigger and plunger pistons. When P2 is independently raised without raising P1 the trigger and plunger pistons are both moved to the right with the plunger piston head striking the blind flange 144 and the trigger piston moving to the relative position of FIGURE 15 relative to the plunger piston with the prong 171a being pivoted below the stem as shown. It will be then clear that pressure signals other than the proper ones result in malfunctioning of the device so that the tumbler is not displaced to unlock the locking stem.

It will be apparent that a new and improved operator device operable responsive to a predetermined combination of pressures has been described and illustrated.

It will be seen that the operator device is nonresponsive to a fluid pressure or a combination of fluid pressures other than the specific predetermined pressure combination at which the operator device is designed to function.

It will also be seen that when the operator device is locked at an end position it will remain inoperable in such locked position when pressure signals are transmitted to it other than the particular pressure signals for which the operator device is designed.

It will additionally be seen that the operator device includes a piston which is reciprocatable and releasable from locked end positions in response to a predetermined combination of pressure signals.

It will also be seen that the operator device is operable responsive to fluid pressure from two pressure sources with a particular predetermined pressure differential between such pressures being maintained while such pressures are simultaneously raised and lowered to unlock and drive the main piston of the device.

If the operator device 20 is connected through its piston rod 23 to apparatus which biases the piston rod upwardly the main piston cannot be locked in the downward position of FIGURE 3. During downward travel of the main piston the collet heads, locking stem, and main piston are relatively positioned as in FIGURE 2. When the main piston arrives at the lower end position the collet heads are aligned between the locking recess 73 on the locking stem and the locking recess 66 in the main piston. When the pressure P2 is reduced to allow the locking stem to return to the intermediate locked position, the force biasing the piston rod and main piston upwardly moves the piston back upwardly before the locking stem can move from the position of FIGURE 2 to the locked position of FIGURE 3. The shoulder 66a cams the collet heads back into the recess 73 before the stem can move the flange 75 within the heads so the main piston is not locked in the downward position. Such a situation may exist when the operator device is used to operate a gate valve such as a well master valve on high pressure wells. The pressure inside the valve would tend to always bias the valve stem outwardly and when connected to an operator device 20 would be tending to bias the piston rod upwardly or toward the locking stem. Also, if the main piston rod is biased downwardly, the main piston cannot be locked at the upper end position. FIGURE 8 illustrates an alternative form of operator device which is used to operate apparatus which constantly biases the main piston rod in one direction.

Referring to FIGURE 8 the operator device 20a is identical in all respects to the operator device 20 with the exception of certain changes in the main piston and the locking stem. A fragmentary view of the operator device 20a is shown to illustrate only the features in the device which differ from the operator device 20. All other parts and features of the device 20a are identical to the device 20. The main piston 200 is identical to the piston 21 except that the bore 201 has been reduced in size and the packing 202 corresponding to the packing 54 has been enlarged to seal around a locking stem having a reduced lower section as compared with the locking stem of the embodiment of FIGURE 1. The locking stem 203 is identical to the locking stem 25 from the lower end of the intermediate section 203a upwardly through the upper end of the stem. The lower reduced section 203b of the locking stem is connected with the intermediate section of the stem by the further reduced section 203c on which the spool 204 is slidably mounted to move between the upper shoulder 205 limiting the upward movement of the spool and the lower shoulder 210 limiting the downward movement of the spool. The spool has an upper annular locking flange 211 and a lower annular locking flange 212 separated by the annular locking recess 213. The locking flanges of the spool are larger in diameter than the bore 201 so that the lower face of the locking flange 212 seats on the annular shoulder 214 within the main piston to limit the downward movement of the spool relative to the piston.

The steps of operating the operator device 20a are the same as those for the device 20. The operation of the device 20a will therefore be explained only in terms of the different functions of the locking stem in adapting to a load constantly biasing the main piston upwardly. Such functions are shown diagrammatically in FIGURES 9–13. Assuming the device is in the position illustrated in FIGURES 1 and 8 with the main piston at the upper end of its stroke and locked by the collet, the pressure P2 is raised to the desired predetermined level to obtain the proper relative positions between the plunger piston and the trigger piston for aligning the push rod prong 171a with the stem 131. The pressures P1 and P2 are then each simultaneously raised at the same rate maintaining the predetermined pressure differential between them to move the plunger and trigger pistons to the left for displacing the tumbler 27 from the bore 123 to unlatch the locking stem. When the stem is released by movement of the tumbler out of the bore 123 the pressure P2 acting on the stem across the packing 202 forces the locking stem downwardly until the lower end of the spool engages the shoulder 214 within the piston as in FIGURE 9. The spool is pushed downwardly by the engagement of the upper end of the spool with the shoulder 205 around the lower end of the intermediate section 203a of the stem. When the lower end of the spool is engaged with the shoulder 214 the locking recess 204 of the spool is aligned with the collet heads. The pressure P2 may now be increased or the pressure P1 may be decreased so that the pressure differential acting across the main piston can displace the piston downwardly against the load connected to the piston rod. Downward movement of the main piston causes the annular shoulder 70 to engage the external bosses 82 of the collet finger heads camming the collet fingers inwardly into the locking recess 213 of the spool thus releasing the main piston to allow it to move downwardly as shown in FIGURE 9. With the collet fingers cammed inwardly the main piston moves to the lower end of its stroke at which position the collet fingers spring outwardly into the locking recess 66 of the piston. During the downward travel of the piston the shoulder 214 of the piston moves downwardly away from the lower end of the spool and the heads of the collet fingers are cammed by the wall of the bore 64b into the locking recess of the spool holding the spool to prevent further the permissible downward stroke of the locking stem. When the collet finger heads spring outwardly into the locking recess 66, as in FIGURE 10, the higher pressure P2 is still being exerted against the upper surfaces of the main piston and the surfaces of the locking stem above the packing 202 so that the locking stem is displaced further downwardly to align the locking flange 211 on the spool within the collet heads so that the collet heads are held outwardly within the locking recess 66 by the upper flange on the spool to lock the main piston at the downward end of its stroke. This further movement downwardly of the locking stem can be effected because the initial downward movement of the locking stem, as in FIGURE 9, when the lower end of the spool engages the flange 214 within the piston only uses a portion of the permissible downward stroke of the locking stem. Therefore, when the main piston is in its downward locked position the locking stem is positioned downwardly as shown in FIGURE 10 with the shoulder 205 engaged with the upper end of the spool and the locking flange 211 of the spool within the inner bosses of the collet finger heads holding the collet fingers locked outwardly in the locking recess 66 of the main piston. The pressure P2 may now be lowered since the main piston is locked in the downward position and thus will hold the constant upward load being imposed on the piston rod 23. When the pressure P2 is decreased a sufficient amount the compressed spring 104 around the upper end of the locking stem expands to return the stem to its intermediate locked position. The locking stem is forced upwardly until the washer 102 at the upper end of the spring engages the upper end of the spring chamber 91 at which time the tumbler 27 is aligned with the bore 123 so that the plunger assembly 112 forces the right end of the tumbler back into the bore depressing the piston head 130 of the plunger assembly 124 further into the bore 123. At the time of the increase of P2 or the decrease of P1, the springs 182 and 61 with the changed pressure relationship across the trigger and plunger piston moves the trigger assembly away from the stem 131 to allow reinsertion of tumbler into the bore 123. Due to the sliding relationship between the spool and the reduced portion 203c of the locking stem the locking stem is returnable to its intermediate position leaving the spool with the locking flange 211 aligned within the collet heads to hold the collet heads outwardly within the locking recess 66 of the main piston when the locking stem is thus returned to the intermediate locked position shown in FIGURE 11 and the stem has moved through the spool with the lower shoulder 210 on the stem engaging the lower end of the spool.

The main piston is released from lower end position of FIGURE 11 for movement upwardly by increasing the pressure P1 to the required predetermined differential in excess of the pressure P2 so that the trigger piston is displaced to the left relative to the plunger piston to rotate the push rod prong 171b clockwise into alignment with the stem 131. The pressures P1 and P2 are then simultaneously raised at the same rate maintaining the pressure P1 the desired value in excess of the pressure P2 so that the push rod prong will remain aligned with the stem 131. When the tumbler is thus displaced from the bore 123 the locking stem is free to be moved upwardly. The higher pressure P1 acting through the chamber 32a and the flow passage 72 against the lower surfaces of the locking stem below the packing 54 starts the locking stem moving upwardly. Since the lower end of the spool as shown in FIGURE 11 is engaged with the shoulder 210 on the locking stem, upward movement of the stem lifts the spool. With the locking stem moving upwardly lifting the spool relative to the collet fingers the spool locking recess 213 moves into alignment with the internal bosses 80 of the collet finger heads so that the collet finger heads may be cammed inwardly to free the main piston for upward movement. The main piston is biased upwardly by the pressure P1 at the same time that the locking stem is forced upwardly by the pressure P1 and therefore the internal annular shoulder 66a of the main piston is engaging the lower end of the external bosses 82 of the collet finger heads as the main piston attempts to move upwardly simultaneously with the upward movement of the locking stem. The shoulder 66a cams the collet finger heads into the locking recess 213 as soon as the locking stem has moved the spool upwardly sufficiently for the locking recess on the spool to be within the internal bosses 80 of the collet finger heads. As shown in FIGURE 12 the piston cams the collet finger heads into the spool locking recess 213 freeing the main piston for upward movement and holding the spool and locking stem at an intermediate upward position as in FIGURE 12. It will be noted in FIGURE 12 that the tumbler 110 is about half way between the bore 123 and the upper side of the bore 113. The collet finger heads which are held in the locking recess of the spool by the wall of the bore of the main piston hold the spool in the position shown in FIGURE 12 so long as the collet finger heads are held in the locking recess of the spool. Since the lower end of the spool is engaged with the shoulder 210 on the locking stem, the locking stem is held against further upward movement so long as the collet finger heads are cammed inwardly. The main piston continued its upward travel until the lower locking recess 65 is aligned with the external bosses 82 of the collet finger heads at which time the collet fingers spring outwardly into the lower locking recess as in FIGURE 13. When the collet fingers spring outwardly from the locking recess on the spool the spool is released to move farther upwardly and since the pressure P1 is still being exerted against the lower end of the stem below the packing 202 the pressure differential across the stem produces a force lifting the stem upwardly until the shoulder 95 around the upper portion of the locking stem engages the washer 102 at which time the locking flange 212 on the spool is within the collet finger heads holding the heads within the lower locking recess of the main piston and thus locking the main piston in the upward position shown in FIGURE 13. The pressure P1 is now lowered allowing the spring 104 to expand to return the stem downwardly until the tumbler is again engaged in the bore 123 as in FIGURE 8. Due to the sliding relationship between the spool and the locking stem the stem slides within the spool downwardly returning to the position illustrated in FIGURE 8 with the lower locking flange 212 remaining within the collet heads and the shoulder 205 on the stem engaging the upper end of the spool so that in the next cycle of operation the stem may lower the spool to release the main piston for downward movement again.

The use of the spool mounted in sliding relationship on the locking stem permits the return of the locking stem to a locked condition without affecting the longitudinal position of the spool and its relationship with the collet finger heads whereby the locked relationship between the collet finger heads and the main piston is not altered during the return of the locking stem to its locked condition. This permits the main cylinder to be under a constant load or bias in one direction while the stem is shifting positions as distinguished from the embodiment of FIGURE 1 where the relationship between the locking flange and the collet heads is altered with movement of the locking stem as the locking flange is fixed on the movable locking stem. In the embodiment of FIGURE 1 the locked relationship between the locking flange 75 and the collet finger heads is not established in each cycle until the locking stem has been returned to the locked position illustrated in FIGURE 1 where in the embodiment of FIGURE 8 the locked relationship between the locking flanges on the spool and the collet finger heads is established and the stem is subsequentially returned to a locked position because of the sliding relationship between the spool and the locking stem.

It will be apparent that there has been described and illustrated a fluid actuated operator device having a reciprocatable piston which is lockable at end positions when the piston rod of such device is interconnected with means operable by such device which constantly biases the piston rod of the operator device in one longitudinal direction.

It will be seen that the operator device of FIGURE 8 includes a reciprocatable locking stem lockable at an intermediate position and movable between two end positions, such locking stem carrying a spool fitted in sliding relationship on the locking stem and movable relative to the locking stem, the spool having locking flanges positionable within collet heads to hold the collet heads in an outward locked position in a locking recess in the main piston of the operator device.

It will be further seen that the use of a slidable spool on the locking stem of the operator device allows the spool to be placed in locking relationship within the collet heads which hold the main piston against longitudinal movement and permits the locking stem to be returned to a locked position without altering the relationship between a locking flange on the spool and the collet finger heads.

Since the operator devices 20 and 20a function in response to particular pressure levels from two pressure sources and a particular predetermined pressure differential between the pressures from the two pressure sources, it will be apparent that a plurality of the operator devices may be combined in a single system with each of the devices being connected to common conduits extending from the pressure sources and designed to function in response to different pressure levels and pressure differentials. For example, FIGURE 5 illustrates a system including three operator devices connected in parallel between common conduits extending from a single pressure source. FIGURE 6 and 7 illustrate more complex systems employing large numbers of the operator devices.

In the system shown in FIGURE 5 a single control station 300 is connected by the conduits 301 and 302 to a plurality of the operator devices 20 or 20a so that from the control station fluid pressures P1 and P2 may be simultaneously applied to all of the operator devices through the lines 301 and 302, respectively. Each of the operator devices is connected to means to be actuated by the devices such as the wells 303, 304, and 305, each of which has a valve, not shown, which is opened and closed by its respective operator device. The control station 300 is any suitable unit or combination of units which will supply fluid under pressure through the conduits 301 and 302, adjust the pressure in each of the conduits at different levels to maintain a desired predetermined pressure differential between the fluid and the conduits, and raise the pressure simultaneously in the two conduits while maintaining the predetermined pressure differential between the pressures in the two conduits. The pressure differentials required to actuate the operator devices may, for example, be set for the operator devices connected to the wells 303, 304, and 305 at 400 pounds, 600 pounds, and 800 pounds respectively. Thus, in order to operate the device connected to the well 303 the control station 300 is adjusted to provide fluid under pressure in the conduits 301 and 302 at a pressure differential such that P1 and P2 will differ in the amount of 400 pounds. The pressure differential will align a prong of the push rod 171 with the stem 131 in the operator device connected to the well 303. The pressures P1 and P2 are then simultaneously raised while maintaining a differential of 400 pounds to displace the tumbler 27 from the bore 123 releasing the locking stem for longitudinal movement so that the main piston is free to be moved longitudinally. When the main piston is thus released the pressure moving the piston toward the opposite end position may be increased if necessary to move the piston to such position against the load imposed by the valve on the well 303. Since the operator devices connected to the wells 304 and 305 require a greater pressure differential they will not be actuated by the 400 pounds pressure differential established between P1 and P2 and the simultaneous raising of these pressures at that differential. While this pressure differential and subsequent raising of the pressures is transmitted to the operator devices connected to the wells 304 and 305, the trigger pistons and the plunger pistons for such devices will be relatively positioned to rotate the push rod 171 of each of the devices less than the required amount to align a push rod prong with the stem 131 in each of the devices. Therefore, the pressure transmitted to actuate the device connected to the well 303 will not unlock the locking stem on each of the devices connected to the wells 304 and 305. When it is desired to actuate the operator device connected to the well 304 the previously described procedure is followed with the pressure differential between P1 and P2 being established at the control station at a level of 600 pounds. While the 600 pound differential will actuate the operator device connected to the well 304 it will rotate the push rod 171 in the device connected to the well 303 beyond the position of alignment of one of the prongs with the stem 131 while in the device connected to the well 305 the push rod will not be rotated far enough to be in alignment with the stem and thus the two operator devices other than that one connected to the well 304 are not operable by the procedure employing the pressure differential of 600 pounds. When the device connected to the well 305 is operated at the 800 pounds pressure differential the push rods in each of the other operator devices will each be rotated beyond the point of position of alignment of one of the prongs with the stem and thus the locking stems will not be released in either of the devices connected to the wells 303 and 304 when the 800 pound pressure differential is used.

It will thus be seen that a plurality of the operator devices of the invention may be connected in parallel between two conduits leading from a pressure control station and any one of the operator devices may be actuated by transmitting through the conduits the particular pressure combination for which the operator device is designed without affecting the condition of the other operator devices connected to the conduits.

It will be apparent that in the system of FIGURE 5 the pressures P1 and/or P2 may be raised and lowered without causing the operation of any of the devices unless the required differential for one of the devices is established between the two pressures and the pressures are then simultaneously raised at the same rate to release the locking stem of the device. It is, therefore, remote that the proper pressure differential would be accidentally transmitted to any one of the devices to cause its operation.

A further enlarged system employing a substantial number of the operator devices is shown schematically in FIGURES 6 and 7. Referring to FIGURE 6 the conduits 400 and 401 extend from a control station, not shown, such as the control station 300 in FIGURE 5, which is capable of transmitting pressure through each of the conduits, maintaining a predetermined pressure differential between the fluids in the conduits, and raising the pressure in each of the conduits simultaneously at the same rate while maintaining the required pressure differential between the conduit. A plurality of main operator devices 402–402i, each of which may be an operator device 20 or 20a, are connected in parallel between the conduits 400 and 401 so that the pressures P1 and P2 may be conducted to each of the devices through the conduits from the control station. Each of the devices 402–402i is connected with suitable valves, not shown, actuated by the devices to switch the pressures P1 and P2 to the units of the system represented by the squares 403–403i which, as illustrated in greater detail in FIGURE 7, includes a total of 100 of the operator devices, each of which also is operable in response to pressure signals communicated to the devices through the conduits 400 and 401 from the control station.

Referring to FIGURE 7 it is seen that the unit 403 is connected with the main operator device 402 by the conduits 400a and 401a which communicate the pressures P1 and P2 to the unit from the operator device 402. The device 402 actuates suitable valves, not shown, which interconnect the conduits 400 and 400a and 401 and 401a, respectively. The series of ten head operator devices 404–404i are connected in parallel between the conduits 400a and 401a so that the pressures P1 and P2 may be communicated from the operator device 402 to the head operator devices 404–404i such that with the proper pressure code any one of the operator devices may be actuated. Each of the head operator devices 404–404i is connected through suitable valves and conduits with a grouping of nine additional operator devices so that from any one of the devices 404–404i, one of nine additional operator devices may be actuated when the proper code is employed. By transmission of the proper series of codes from the control station access may be had to any one of the operator devices in the complete system as shown in FIGURES 6 and 7. Assume, for example, that access to and operation of the operator device 405 is desired. From the control station the proper pressure differential is established between P1 and P2 to release the locking stem in the operator device 402 after which the pressures are uniformly and simultaneously raised at the predetermined pressure differential to release the locking stem so that the operator device may be actuated. Actuation of the operator device 402 interconnects the conduits 400 and 401 with the conduits 400a and 401a leading to the unit 403. Next, the pressure code is transmitted from the control station to operate the device 404a. Actuation of the operator device 404a interconnects it with the conduits leading to all of the devices connected with the device 404a. The pressure code for the device 405 is now transmitted from the control station to operate the device 405. All of the devices in the system are similarly accessible and operable by the transmission of three separate pressure codes in proper sequence from the central control station. The system illustrated in FIGURES 6 and 7 includes 1010 operator devices. Since each of the operator devices 402–402i and 404–404i in each of the units 403–403i are employed for fluid pressure switching purposes to provide access to the individual devices, each of which may be connected to a well, it will be apparent that of the 1010 operator devices in the system 900 are available for actual operation of individual wells. Therefore, a system such as shown in FIGURES 6 and 7 may be utilized to control 900 individual wells in an oil well field providing means for opening and shutting the wells and performing other desired functions which may be carried out by the reciprocating action of the piston rods of the operator devices.

Obviously systems such as those described above utilizing a plurality of the operator devices of the invention are not limited to any particular number of such operator devices. A practically unlimited number of arrangements similar to those described above may be worked out.

It is thus seen that the operator devices of the invention may be arranged in any desired numbers with access being available to any one of the devices by use of the proper combination of fluid pressure codes depending upon the number of devices in the system and the manner in which they are interconnected.

While the operator devices 20 and 20a have been described in terms of their requiring a particular pressure differential to properly align one of the prongs of the push rod 171 with the stem 131, it will be recognized that minor modifications in structure may be made between the push rod and the stem 131 to permit some range or latitude in the pressure differential for actuating the device. The stem 131 may have a head such as on a nail to provide a larger target for the push rod 171 to strike so that the push rod will engage the stem even when the pressure differential is somewhat larger or smaller than that necessary for precise alignment of the push rod and stem. Another modification which will permit some latitude in the operating range of the pressure differential is to form a conical or point-like end on the prongs of the push rod 171 with a complementary conical recess in the outward end of the stem 131 so that when the push rod moves toward the stem engagement of the two is effected even though the push rod is somewhat out of alignment with the stem. By so altering the push rod and stem an operator device may be designed in which the locking stem is releasable by a pressure differential ranging between a predetermined minimum and a predetermined maximum.

A modification in which may be readily incorporated in the apparatus of the invention is the connection of a pressure conduit into the opening 185 so that a fluid pressure P3 may be applied into the annular chamber 133 around the piston 140. This modification is to be distinguished from the previously discussed embodiments of the invention which provide for the chamber 133 to be exposed to atmospheric pressure through the opening 185. By application of controllable fluid pressure within this annular chamber further pressure code signals may be devised for the operation of the apparatus. The force resulting from the application of P3 within this annular chamber acts in the same direction as the force of the spring 182 to urge the plunger piston toward the right away from the stem 131. Since the pressure P1 applies a force to the right end of the piston 140 acting against the spring 182 and the force of the pressure P3, a variation in the P3 obviously requires a variation in the pressure P1 to effect operation of the plunger piston. A larger P3 will require a larger P1 to effect leftward movement of the plunger piston. Therefore, having available a controllable pressure in the annular chamber 133 enlarges the pressure code signal combinations which may be employed for operation of the apparatus of the invention.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A fluid actuated system for carrying out a plurality of independent mechanical work functions including: a plurality of operator devices, each said operator device having locking means thereon preventing actuation thereof and releasable by pressure responsive release trigger means actuatable responsive to fluid pressures of a predetermined differential established thereacross and simultaneously raised while maintaining said predetermined pressure differential for moving said release trigger means to a position releasing said lock means to enable said operator device to be actuated by fluid pressure, each said lock means and release trigger means of each operator device being responsive to a different predetermined pressure differential whereby said fluid pressures may be simultaneously applied to all of said operator devices with the locking means and release trigger means of only one of said operator devices being actuated responsive to the particular predetermined differential being imposed on all said devices to enable said one operator device to be actuated; and conduit means extending between a pressure control station and said operator devices supplying fluid pressure for actuating said operator devices.

2. A system according to claim 1 wherein said conduit means comprises a pair of separate fluid pressure conduits, and said operator devices are connected in parallel between said conduits with said conduits communicating with said release trigger means of each operator device to apply a fluid pressure differential thereacross to actuate the same.

3. A fluid actuated system for effecting a plurality of independent mechanical work functions including: a plurality of operator device units, each of said units comprising a main operator device and a plurality of grouping of individual operator devices; pressure fluid conduits connected to each of said operator devices of each unit for actuating the same; each said operator device having locking means thereon preventing actuation thereof and releasable by pressure responsive release trigger means actuatable responsive to fluid pressures of a predetermined differential established thereacross and raised while simultaneously maintaining said predetermined pressure differential for moving said release trigger means to a position releasing said locking means to enable said operator device to be actuated by fluid pressure, each said locking means and release trigger means of each operator device being responsive to a different predetermined pressure differential whereby said fluid pressures may be simultaneously applied to a plurality of said operator devices in each of said units with the locking means and release trigger means of only one of said operator devices being actuated in response to a particular predetermined pressure differential signal combination; said main operator device in each of said units having fluid pressure inter-connection with each grouping of a plurality of operator devices in said units whereby said main operator device actuated by its predetermined pressure differential signal combination interconnects the fluid conduits connected to it with fluid conduits connected to each grouping of operator devices of said unit whereby a predetermined pressure differential signal combination may be applied to the operator devices of a selected grouping to actuate the locking means and release trigger means of a selected operator device of said selected grouping for enabling actuation of said selected operator device in response to its predetermined pressure differential signal combination; said pressure fluid conducting conduits connected with the operator devices of each said units being connected to at least one fluid pressure source operable to supply fluid pressures at predetermined pressure differentials and operable to raise the level of such pressures simultaneously while maintaining said predetermined pressure differential.

4. A fluid actuated system for carrying out a plurality of independent work functions including: a plurality of operator device units, each said operator device unit including a main operator device and a plurality of groupings of individual operator devices; pressure fluid conduits connected to each of said operator devices of each unit for actuating the same; each said operator device having locking means thereon preventing actuation thereof and releasable by pressure responsive release trigger means actuatable responsive to a fluid pressure differential signal transmitted to said operator devices at a predetermined differential and raised while simultaneously maintaining said pressure differential for moving said release trigger means to a position releasing said locking means to enable said operator device to be actuated by fluid pressure, each said locking means and release trigger means of each operator device within each of said units having locking means responsive to a different predetermined pressure differential whereby fluid pressures may be simultaneously applied to said operator devices in each of said units with the locking means and release trigger means of only one of said operator devices being actuated responsive to the particular predetermined pressure differential signal being imposed on the operator devices in said unit; said units of operator devices being operatively interconnected with each other by said fluid pressure conduits whereby a predetermined pressure differential signal transmitted to a selected main operator device of one of said units actuates said selected device to fluid pressure interconnect it with the groupings of operator devices in said unit.

5. A fluid actuated system of the character set forth in claim 4, wherein said groupings of operator devices in each of said operator device units are connected with each other by said pressure fluid conduits connecting a head operator device of each grouping, whereby said fluid pressure inter-connection with said groupings of operator devices provides for actuation of a selected one of said head operator devices to establish fluid communication with the operator devices of the selected grouping; the operator devices in said selected grouping being connected in parallel with each other whereby a pressure signal combination transmitted to all said operator devices in selected grouping will actuate only one of said operator devices.

References Cited

UNITED STATES PATENTS

| | | | |
|---|---|---|---|
| 1,994,974 | 3/1935 | Wiedmann | 91—412 X |
| 2,088,261 | 7/1937 | Dienenthal | 91—189 X |
| 2,130,618 | 9/1938 | Gnavi | 60—97 |
| 2,144,893 | 1/1939 | Parker | 91—411 X |
| 2,497,682 | 2/1950 | Mertz | 91—189 X |
| 2,556,834 | 6/1951 | Ashton et al. | 91—411 X |
| 2,659,206 | 11/1953 | Carlson | 91—411 |
| 2,796,789 | 6/1957 | Rice et al. | 60—97 |
| 2,861,593 | 11/1958 | Bowman | 137—637 |
| 3,137,212 | 6/1964 | Rose | 91—189 |
| 3,217,608 | 11/1965 | Bolton et al. | 91—412 |
| 3,240,125 | 3/1966 | Pawling et al. | 91—189 |

MARTIN P. SCHWADRON, *Primary Examiner.*

I. C. COHEN, *Assistant Examiner.*